(12) United States Patent
Lacy (10) Patent No.: US 7,891,326 B1
(45) Date of Patent: Feb. 22, 2011

(54) ENGINE EXHAUST SYSTEM

(76) Inventor: James W. Lacy, 25526 Redlands Blvd., # 30, Loma Linda, CA (US) 92354

(*) Notice: Subject to any disclaimer, the term of this patent is extended or adjusted under 35 U.S.C. 154(b) by 757 days.

(21) Appl. No.: 11/807,846

(22) Filed: May 29, 2007

Related U.S. Application Data (63) Continuation-in-part of application No. 10/758,839, filed on Jan. 16, 2004, now abandoned.

(60) Provisional application No. 60/441,229, filed on Jan. 21, 2003.

(51) Int. Cl.
*F02B 25/00* (2006.01)

(52) U.S. Cl. ............... 123/65 E; 123/65 SP; 123/65 R; 60/312; 60/314; 181/256

(58) Field of Classification Search ............ 123/65 SP, 123/65 E; 60/312, 314; 181/256
See application file for complete search history.

(56) References Cited

U.S. PATENT DOCUMENTS

| | | | | |
|---|---|---|---|---|
| 3,338,682 A | * | 8/1967 | Lentz et al. | 422/179 |
| 3,786,791 A | * | 1/1974 | Richardson | 123/65 EM |
| 4,920,745 A | * | 5/1990 | Gilbert | 60/273 |
| 5,044,159 A | * | 9/1991 | Landfahrer et al. | 60/314 |
| 5,371,331 A | * | 12/1994 | Wall | 181/227 |
| 5,992,560 A | * | 11/1999 | Matsuoka et al. | 181/252 |
| 6,840,037 B2 | * | 1/2005 | Oberhardt | 60/312 |

* cited by examiner

*Primary Examiner*—Michael Cuff
*Assistant Examiner*—Hung Q Nguyen
(74) *Attorney, Agent, or Firm*—Dennis W. Beech (57) ABSTRACT

The engine exhaust system may allow scavenging of two-stroke engines using a retro-tube attached to an exhaust port of a two-stroke engine. Intake air may be obtained directly from environmental air at atmospheric pressure allowed by engine cycle operation and an approximately constant diameter retro-tube having a volume approximately equal to a swept volume of the piston movement.

6 Claims, 7 Drawing Sheets fig.1 fig. 2

ENGINE EXHAUST SYSTEM

Reference is made to my Provisional Application No. 60/441,229, filed Jan. 21, 2003, entitled "Engine Exhaust System." This is a continuation-in-part of U.S. patent application Ser. No. 10/758,839 filed on Jan. 16, 2004 now abandoned. U.S. patent application Ser. No. 10/758,839 is pending.

BACKGROUND OF THE INVENTION

The present invention involves utilization of two major principles, these being (A) the "blowerless" principle, which is the use of exhaust energy to draw air into the combustion cylinder, and (B) the retro-flow principle which is a reverse flow of air back through an exhaust outlet tube and into the cylinder.

Historically, the blowerless principle has been used in experimental engines as the sole source of scavenging air. Other two-stroke engines also now use the principle, but only to augment the pressure difference. The retro-flow principle, so far as can be determined, has not heretofore been discovered and exploited.

Heretofore, there have been many attempts to design and provide a two, stroke engine which is not dependent for its combustion air upon crankcase air pumping or a blower. Although certain of these attempts have succeeded, in each case the engine speed range was quite limited, and long bulky pipes were required to provide air intake.

SUMMARY OF THE INVENTION

The present invention provides a new way to scavenge two-stroke engines, and in addition provides a new type of operation comprising an internal cooling of the engine cylinder and the piston.

The invention provides simplicity of manufacture, and a high degree of reliability.

These and other features, aspects and advantages of the present invention will become better understood with reference to the following drawings, description and claims.

DETAILED DESCRIPTION

The following detailed description represents the best currently contemplated modes for carrying out the invention. The description is not to be taken in a limiting sense, but is made merely for the purpose of illustrating the general principles of the invention.

Atmospheric air is drawn through intake ports into the cylinder due to the lowered pressure produced by the rapid exit of exhaust gases. Early experiments have shown this to occur, but a relatively long pipe was required and the engine(s) had an inferior speed range.

Recent experiments have uncovered a new way to draw air into the engine. Besides the initial draw through intake ports, at a later point in the cycle there is a reverse air flow back into the exhaust tube. This principle was discovered by noting the unusually cool temperature of the outlet tube, and conducting other follow-up experiments.

The blowerless principle utilized with the present invention provides the following advantages and results:

1. As crankcase air pumping is no longer required, pressure lubricated journal bearings can be used.
2. There is a great reduction of oil loss and raw fuel loss out the exhaust ports.
3. There is greater available horsepower because no shaft power is used for pumping air.
4. For the reason in #3, there is lower fuel consumption.
5. Fewer engine parts mean a lighter, simpler, cheaper engine.
6. A single-piece crankshaft can be used, with higher unit bearing loads, longer bearing life, and elimination of expensive roller bearings.
7. No separate air pumping chambers in the crankcase are needed for multi-cylinder engines.
8. Due to lack of oil mist lube, spark plug fouling and muffler oil-clogging are almost entirely eliminated.
9. Reed valves or rotary valves at the intake are not needed.
10. Combustion air temperature is lower because it has not been compressed by a blower or crankcase pumping.

Retro-flow cooling provided by the present invention provides the following advantages and results:

1. Engine parts are cooled internally at the very places that have been heated more by outgoing exhaust. This means that there is much less thermal distortion of the pistons and cylinders, which reduces piston seizing and increases reliability and durability.
2. Because the pre-compression temperature of the combustion air is lower, detonation limits are improved, permitting leaner fuel to air rations, higher compression ratios, and larger displacement cylinders.
3. For the reason above, NOx emissions are reduced due to lower maximum temperatures.
4. Less external cooling is required.
5. Higher continuous power levels can be maintained.
6. Because combustion air is cooler, it is also more dense.
7. The exhaust runs much cooler, so liquid cooling for the exhaust pipe is not needed, construction materials are less critical, and oxidation is reduced or eliminated.
8. Because interior surfaces run cooler, lubrication is superior, speed limits are higher, and piston rings work better because carbon build-up is reduced.

The present invention provides the following illustrative sequence of events in the operation of Applicant's claimed combinations, it being noted that retro-tube volume equals cylinder displacement:

1. At blow-down (exhaust opening) the air already in the retro-tube is pushed out. This is the 1st cylinder displacement volume.
2. Then the exhaust itself passes down past the end of the retro-tube, another cylinder displacement volume.

3. At the same time that event occurs, fresh air is being drawn behind that volume of air into the cylinder through the primary intake ports. The exhaust particle velocity is now almost zero.

4. The flow in the retro-tube reverses, and fresh air from the plenum chamber is drawn into the retro-tube, and its inertia raised the pressure and density of the air already in the cylinder. The low pressure in the cylinder has caused this reversal, having been kept at a low pressure by the descent of the piston to bottom dead center. The sudden closing of the intake ports has also aided the flow reversal.

5. When the exhaust port is closed the piston continues moving upward and compression begins.

6. Fuel is injected into the combustion chamber and is ignited before top dead center.

7. The piston descends and blow-down begins at exhaust opening. The stronger the blow-down, the stronger will be the reverse flow.

The retro-tube is heated by the exhaust gases for about 30 degrees of crank rotation, and is cooled by air flow for the remainder of the rotation.

Fresh air pushing into the cylinder via the retro-tube cools the piston crown where it was heated by hot gases on the exhaust side.

The purpose of the separator is to prevent the mixing of secondary air and exhaust.

1. The flow out the end of the retro-tube is fairly compact, that is it does not diverge very much. So another tube, slightly larger, is located just opposite the outlet, about one diameter apart from it. The entry edges of this second tube are rounded so the exhaust gases can be guided back into this second tube.

2. The flow of secondary fresh air into the outlet tube is radially convergent, so there is sufficient space between the two opposite tubes for the air to pass through. The entry of fresh air into the outlet is improved by a slight rounding of the edges of the tube, as the air is accelerating in velocity as it approaches its entry.

3. To reduce the sound level of the engine, a muffler is attached to the exhaust outlet, and another muffler is attached to the secondary air inlet, as the exhaust noise passes just as easily out the air inlet as it does out the exhaust. This second muffler can be made of materials other than metal, as it operates at a low temperature.

Reverse flow does occur in the retro-tube:

1. When a relatively large chamber with an exhaust outlet mounted on the retro-tube outlet, and the fresh air in the chamber becomes increasingly diluted by exhaust gases, the engine will slow, then stop. This proves that the engine depends on a reverse flow of fresh secondary air to run properly.

2. When this reverse flow occurs, then its inertia provides some increase in the charge density of air already in the cylinder, increasing the power of the engine.

3. In order for the reverse air flow of secondary air to reach the exhaust port, at least two displacement volumes of gas have to have been exhausted out the retro-tube; first, relatively fresh air left over from the preceding cycle, and then the exhaust itself. Then the reverse flow provides part or all of another, third displacement volume of air to the exhaust port.

4. If this exhaust system cools the retro-tube (and it does), then it must also be cooling the interior of the engine: the cylinder, the combustion chamber, and especially the edge of the piston closest to the exhaust port.

5. The optimum volume to the retro-tube is equal to the total displacement volume swept by the piston in one stroke.

Further experimentation and development of the engine exhaust system have demonstrated:

1. The mechanism of kinetic energy transfer upstream in the retro-tube, which has the effect of prolonging the draw for the entire scavenging period. An initial compression wave travels down the retro-tube at a very rapid rate, since the particle velocity is added to the wave velocity. However, at the retro-tube outlet the wave is reflected back into the tube as an expansion wave. Since the particle velocity is still considerable, the inward progress of the wave is relatively slow. This expansion wave has the effect of impelling the air outward, and also accelerates air into the intake ports.

2. At the end of the scavenging period, the closing of the intake ports by the piston, the expansion wave is reflected outward, but its sign does not change. Therefore, the combination of the wave action and the inertia of the outflow air suddenly reverse the direction of the air, forming a supercharging pulse for about 30 degrees of crank travel, until the exhaust port closes.

3. This power boost timing is controlled by the piston, and not by a tuned pipe, as in traditional 2-stroke engines, and is therefore an all-speed power boost, the T.P. has a narrow rpm range of effect.

4. This reverse flow phenomenon does not appear to be something pioneers in 2-stroke engines tried to prevent. The earlier engines purpose appears to have been achieved by use of a long tapered outlet pipe.

5. The initial mass of air to be accelerated by the exhaust blow down should be as low as practical, which in the invention is one swept volume. In the engine exhaust system, the air dwelling in the retro-tube for about 180 degrees of crank travel is quite cool. Traditional 2-stroke engines with a tuned pipe may have a hot exhaust.

6. When the retro-tube volume and length are increased, the maximum speed potential of the engine may degrade. When the retro-tube is shortened, the engine may be increasingly difficult to start, as most of the exhaust kinetic energy is wasted into the atmosphere.

The experiments and development have enabled a short exhaust pipe to pump several swept volumes of air per revolution and demonstrated:

1. Experimental established an optimum volume for a retro-tube of 1.0 swept volume.

2. Rerouting the intake air to bypass the crankcase.

3. Extending the traditional, usual time of the scavenging period, i.e., doubling it.

4. Increasing the air flow velocity into the cylinder by maintaining a partial vacuum therein, as low as 0.5 atmospheres, to be restored later in the cycle to a full atmosphere or greater.

5. Utilizing the piston to time the airflow reversal, an all-speed power boost.

6. Utilizing a bellmouth at the retro-tube outlet to increase the flow velocity and volume to improve the power boost.

7. Adding a coaxially integral muffler to the retro-tube unit.

The unusual results discovered in testing the system include: A draw for the entire scavenging period, approximately 120 degrees; the draw of an excess of pure and cool air; internal cooling resulting from the excess air flow; an unusually pure and cool cylinder charge air, less NOx; the bi-directional air flow, including the reverse air flow; inherent supercharging due to the reverse flow at all speeds; and excellent rpm range, low starting rpm and high maximum rpm; and a reduced length and bulk of the exhaust system.

Figure 1:
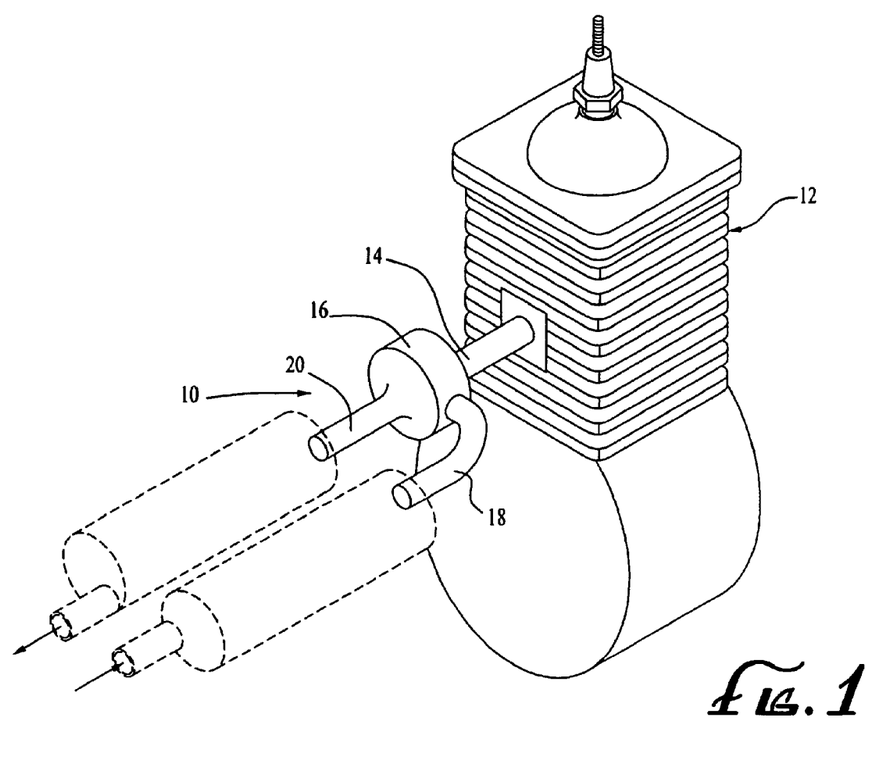
FIG. 1 illustrates a perspective view of a preferred embodiment of the invention.
Figure 2:
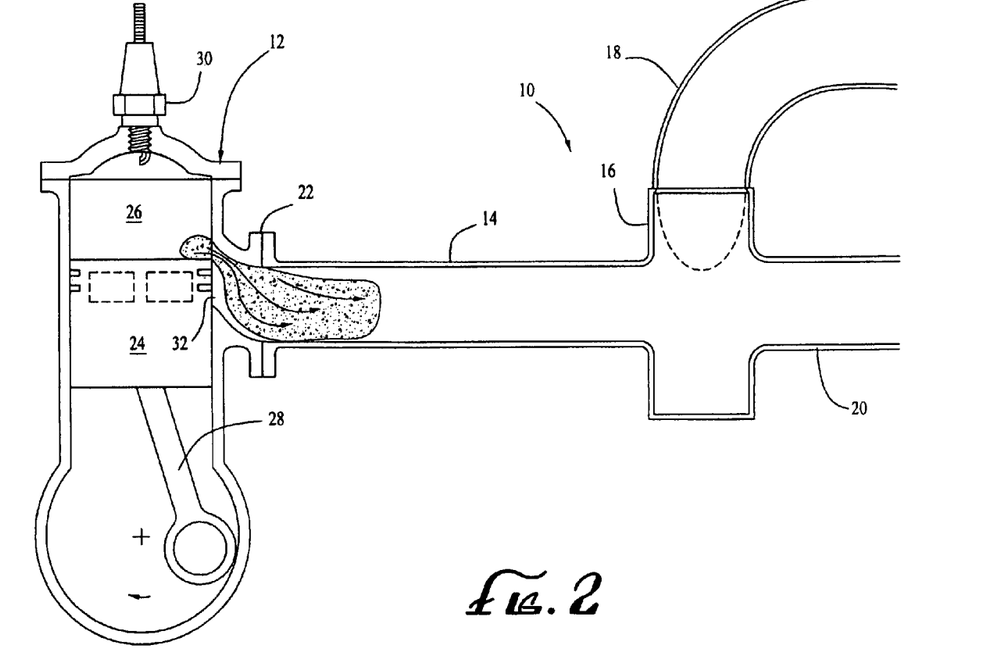
FIG. 2 illustrates an elevation sectional view of the engine embodiment of FIG. 1.

Referring to the drawings, FIGS. 1 and 2 show a preferred embodiment 10 of the invention assembled with a two-stroke engine 12 which two-stroke engine 12 does not have transfer passages in communication with an engine crankcase.

The apparatus of the invention comprises a retro-tube 14, a plenum chamber 16 connected with the retro-tube, a secondary air tube 18 communicating with the plenum chamber, and an exhaust receiver tube 20.

Figure 3:
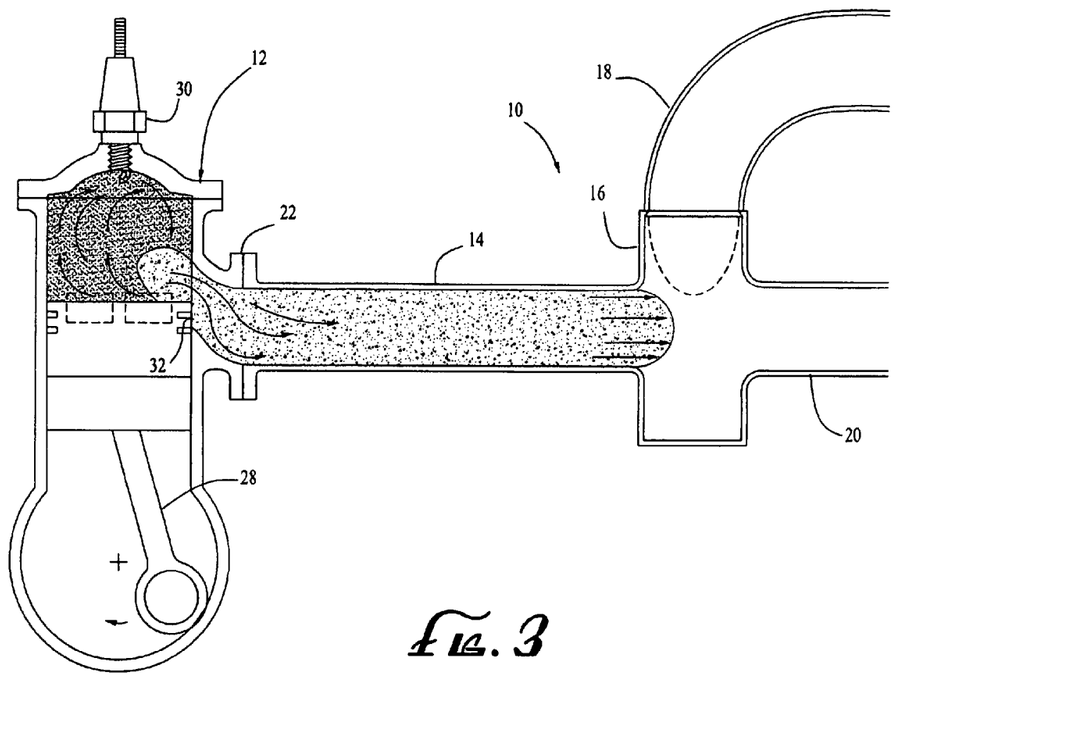
FIG. 3 illustrates an elevation view similar to that of FIG. 2 showing the components in successive positions of operation.

FIG. 3 illustrates the piston 24 descending after combustion has occurred, the exhaust port 32 has partially opened, and the exhaust gases are exiting the engine cylinder 26 through the retro-tube 14. Fresh air is being drawn through the opening intake ports 34 due to the reduced pressure created in the engine cylinder 26 in the wake of the rapidly exiting exhaust gases.

Figure 4:
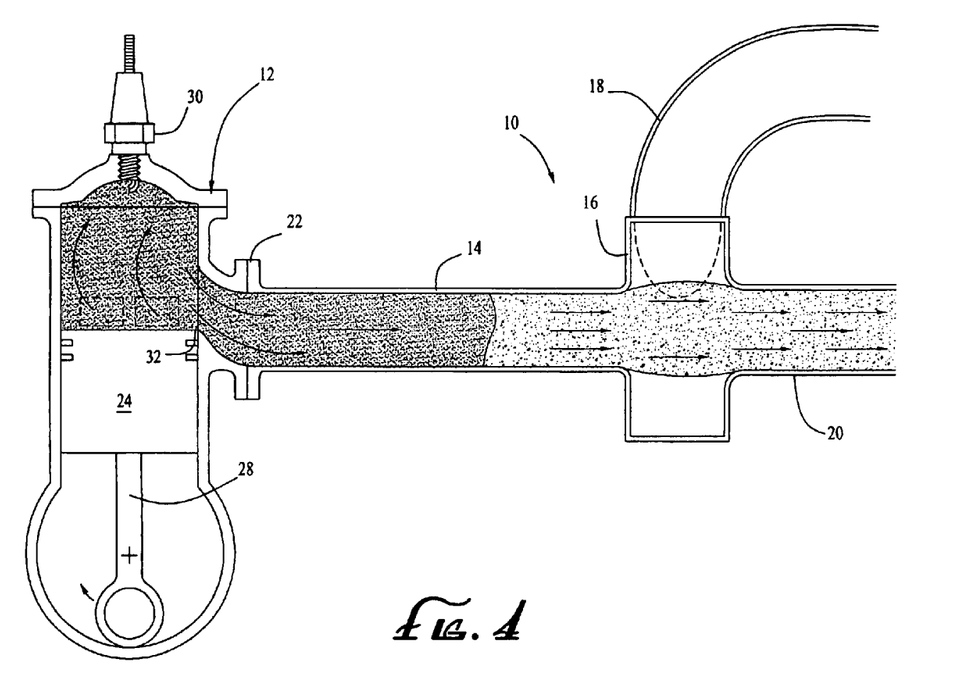
FIG. 4 illustrates an elevation view similar to that of FIGS. 2 and 3 showing the engine in a successive position of operation.

FIG. 4 shows the engine cylinder 26 and adjacent spark plug 30, the cylinder being substantially filled with fresh air, the piston 24 having reached the bottom of its stroke, piston rod 28 being vertical and with excess air approaching the end of the retro-tube 14.

When the intake ports 34 begin to close, the exiting air flow begins to slow and then reverses direction due to the reduced pressure or depression created in the engine cylinder 26 by the exiting air flow through the retro-tube 14 and air may enter the retro-tube 14 at an exhaust end 36.

With the exhaust system cooling the retro-tube, it also cools the engine interior (combustion chamber) and the edge of the piston closest to the exhaust opening. The optimum volume of the retro-tube equals the total displacement volume of a piston in one stroke.

FIG. 2 illustrates a stage of operation wherein exhaust port 32 is open and exhaust is flowing into retro-tube 14.

FIG. 3 shows exhaust flowing into the retro-tube 14 and pushing air thereahead. FIG. 3 shows the exhaust having reached the end of the retro-tube 14, and the exhaust gases having left the retro-tube 14. The intake ports are shown as having just opened, with air being drawn therethrough into the engine cylinder for rapid exit of exhaust with lower pressure therebehind, the kinetic energy of the exhaust air drawing air behind itself.

Referring to FIG. 4, the engine cylinder is shown as substantially filled with fresh air, and the piston having reached the bottom of its stroke, with air, etc., having almost reached the outer end of retro-tube 14, the gases having exited the plenum chamber and passed into the exhaust chamber tube.

The outlet tube conducts exhaust gases outwardly and conducts fresh air inwardly, in sequence. Therefore, means are provided to separate the two gases. The exhaust gases at the end of the tube leave the tube in a fairly compact form, similar to a solid plug, and are collected by a slightly larger diameter tube opposite the original outlet.

Figure 5:
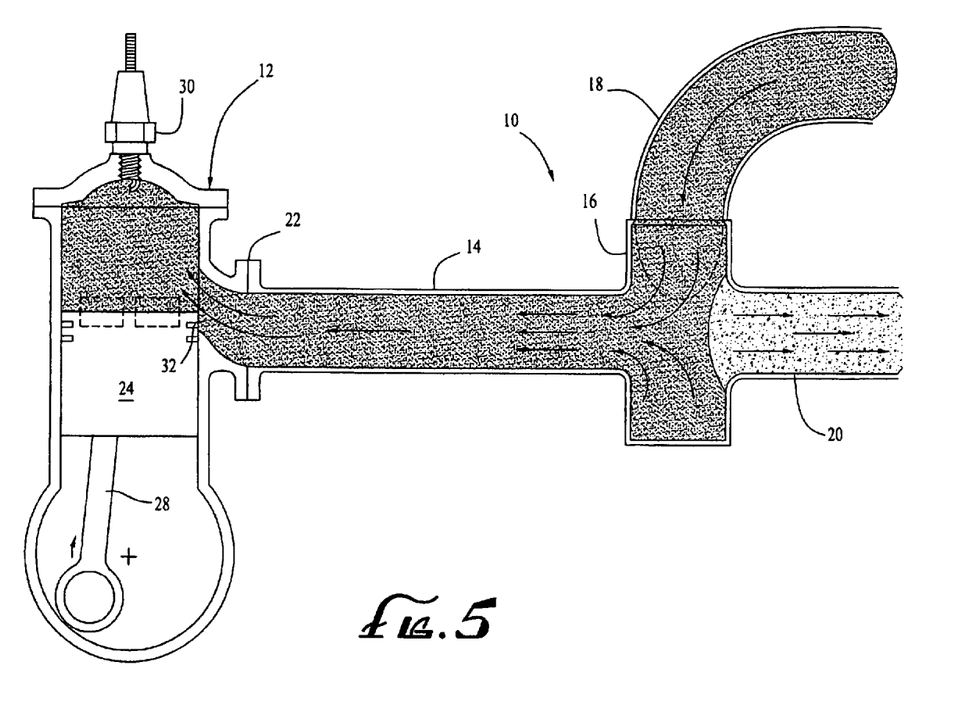
FIG. 5 illustrates an elevation view similar to that of FIGS. 2 and 4 showing gas flow in a successive position of engine operation.

FIG. 5 shows the reverse passing of gases from the plenum chamber 16 via the retro-tube 14 to the combustion chamber.

Figure 6:
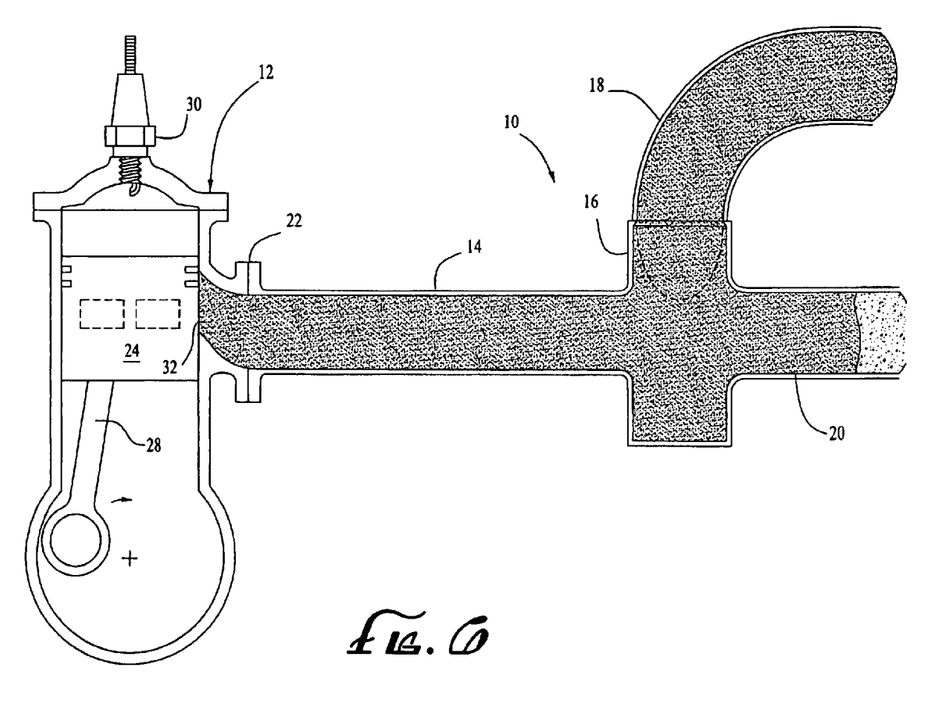
FIG. 6 illustrates an elevation view similar to FIGS. 2 through 5 showing the engine at a later stage of operation.

FIG. 6 shows the exhaust port 32 closed by the piston in its compression stroke, with the gases disposed in the retro-tube 14, plenum chamber 26, secondary air tube 18, and exhaust receiver tube 20.

Figure 7:
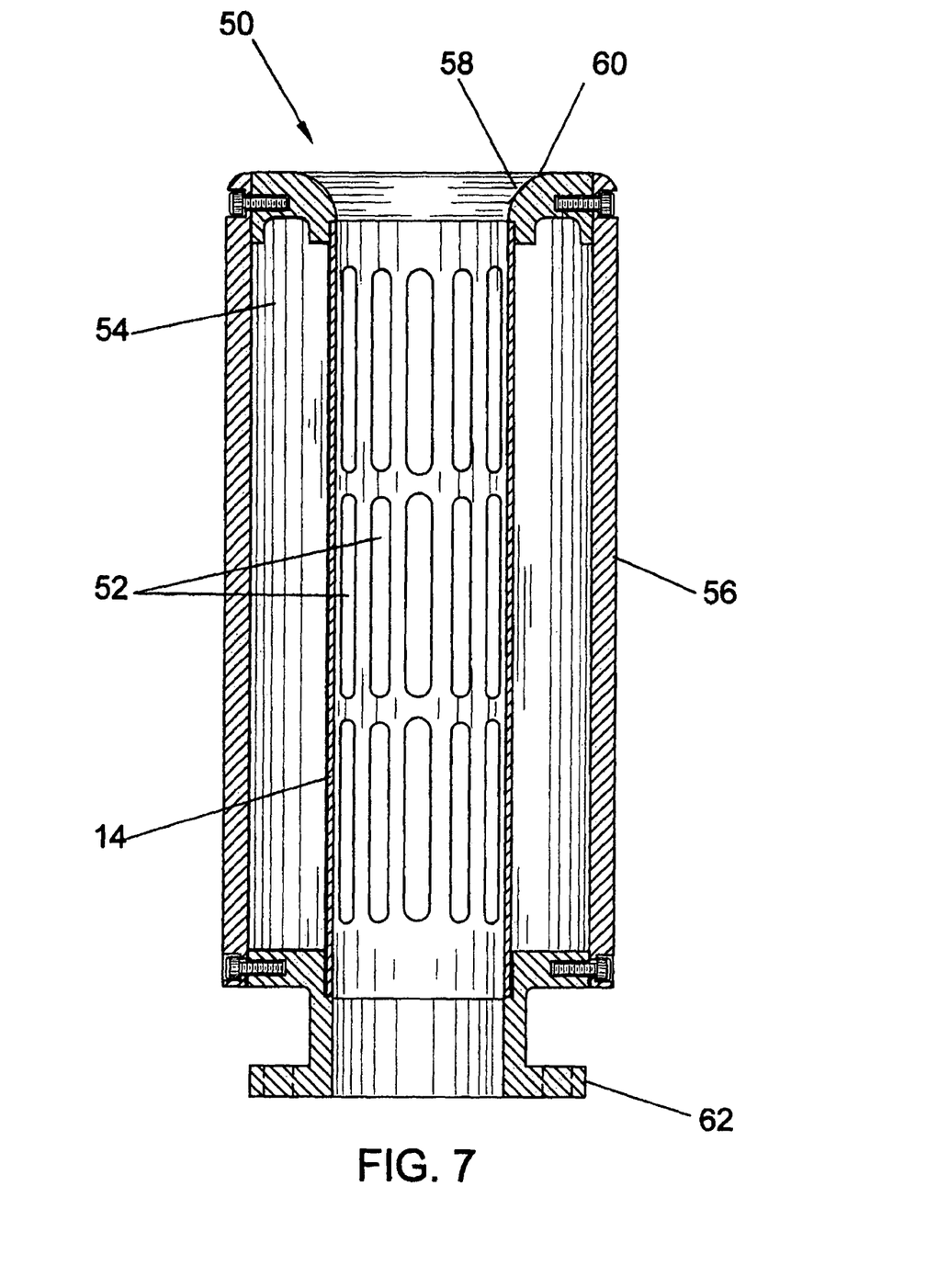
FIG. 7 illustrates a side cross-sectional view of an absorption type silencer according to an embodiment of the invention.

FIG. 7 shows an absorption type silencer 50 that may be added coaxially integral with a retro-tube 14. The silencer 50 may add the functions of silencing the exhaust noise, pumping a large volume of air, supercharging the cylinder air charge, and cooling the engine internally. The retro-tube 14 may be perforated with holes or slots 52, may be covered or wrapped with fiber glass 54 or a similar material, and may be further covered with an outer tube 56. The presence of the perforations may not have a significant effect on the engine output, or on the internal cooling of the engine. The addition of a bellmouth 58 at the outer end 60 opposite the exhaust flange 62 of the silencer 50 may aid in the reverse flow super-charging effect near the end of the scavenging cycle. The optimum internal volume of the retro-tube 14 that is perforated is approximately equal to one swept volume of the engine cylinder It will be understood that various changes and modifications may be made form the preferred embodiments discussed above without departing from the scope of the present invention, which is established by the following claims and equivalents thereof.

I claim:

1. An engine of an internal combustion type comprising:
a two-stroke engine having a cylinder with a movable piston, that defines a combustion chamber;
an intake port in direct communication between said combustion chamber and with environmental air at atmospheric pressure and an exhaust port wherein said intake port and said exhaust port are disposed so that during piston movement said intake port is open after said exhaust port has opened following combustion in said combustion chamber and said intake port is closed before said exhaust port is closed by piston movement;
a retro-tube attached to said exhaust port wherein said retro-tube is of approximately constant diameter and having a volume approximately equal to a swept volume of said piston movement in said cylinder;
a plenum chamber having a diameter approximately equal to three times the diameter of said retro-tube is in communication with an exhaust end of said retro-tube at a retro-tube port;
said plenum chamber having an exhaust tube port opposed to said retro-tube port that is at least the same diameter as said retro-tube and an exhaust receiver tube attached at said exhaust tube port; and
said plenum chamber having an air tube port approximately orthogonal to a center line of said retro-tube and said exhaust tube port.

2. An engine of an internal combustion type comprising:
a two-stroke engine having a cylinder with a movable piston, that defines a combustion chamber;
an intake port in direct communication between said combustion chamber and with environmental air at atmospheric pressure and an exhaust port wherein said intake port and said exhaust port are disposed so that during piston movement said intake port is open after said exhaust port has opened following combustion in said combustion chamber and said intake port is closed before said exhaust port is closed by piston movement; and
a retro-tube attached to said exhaust port wherein said retro-tube is of approximately constant diameter and having a volume approximately equal to a swept volume of said piston movement in said cylinder.

3. The engine as in claim 2 wherein:
a plenum chamber having a diameter approximately equal to three times to the diameter of said retro-tube is in communication with an exhaust end of said retro-tube at a retro-tube port;
said plenum chamber having an exhaust tube port opposed to said retro-tube port that is at least the same diameter as said retro-tube and an exhaust receiver tube attached at said exhaust tube port; and
said plenum chamber having an air tube port approximately orthogonal to a center line of said retro-tube and said exhaust tube port.

4. The engine as in claim 2 wherein a secondary air tube is attached to said air tube port.

5. The engine as in claim 2 wherein a sidewall of said retro-tube has a plurality of apertures formed therein; a sound absorbent material is disposed around said sidewall; and an outer tube is disposed around and coaxially with said retro-tube.

6. The engine as in claim 5 wherein said retro-tube at an outer end has a bellmouth outlet.

* * * * *